United States Patent [19]

Bailey, Jr.

[11] Patent Number: 5,688,600
[45] Date of Patent: *Nov. 18, 1997

[54] THERMOSET REINFORCED CORROSION RESISTANT LAMINATES

[75] Inventor: Edward D. Bailey, Jr., Baker, La.

[73] Assignee: Cobale Co., L.L.C., Baton Rouge, La.

[*] Notice: The term of this patent shall not extend beyond the expiration date of Pat. No. 5,534,337.

[21] Appl. No.: 670,631

[22] Filed: Jun. 26, 1996

Related U.S. Application Data

[63] Continuation of Ser. No. 43,200, Apr. 5, 1993, Pat. No. 5,534,337.

[51] Int. Cl.⁶ ........................................... B32B 27/00
[52] U.S. Cl. .................... 428/421; 428/422; 428/903; 442/88; 442/218; 442/333
[58] Field of Search ........................... 428/236, 286, 428/290, 302, 421, 422, 903

[56] References Cited

FOREIGN PATENT DOCUMENTS 0194381  9/1986  European Pat. Off. .

*Primary Examiner*—Helen Lee
*Attorney, Agent, or Firm*—David L. Ray

[57] ABSTRACT

In accordance with the present invention there is provided a corrosion resistant surfacing veil of a thermoplastic fluoropolymer, and corrosion resistant reinforced thermoset plastic laminates having a surfacing veil of a thermoplastic fluoropolymer.

12 Claims, 1 Drawing Sheet

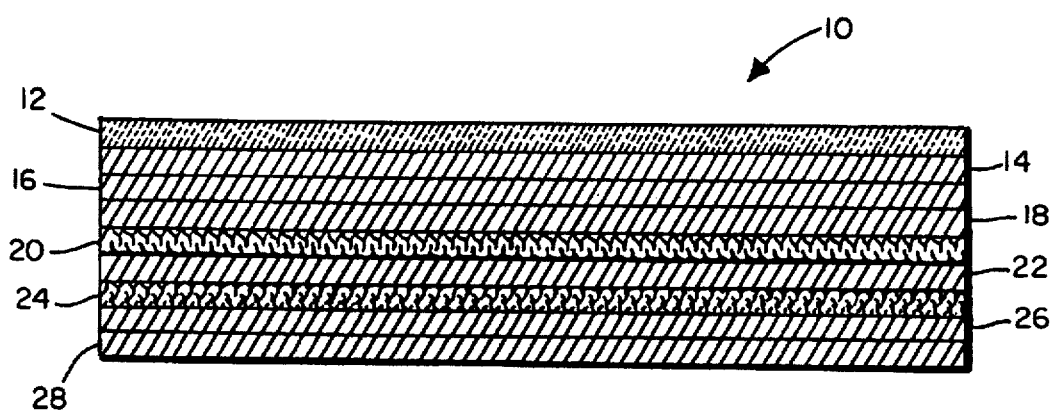

THERMOSET REINFORCED CORROSION RESISTANT LAMINATES

This application is a continuation of Ser. No. 08/043,200, Apr. 5, 1993, now U.S. Pat. No. 5,534,337.

BACKGROUND OF THE INVENTION

1. Field of the Invention

The invention relates to reinforced polymeric laminates. More particularly, the present invention is related to corrosion resistant reinforced thermosetting plastic laminates, and a surfacing veil for incorporation in the laminates.

2. Description of the Related Art

The use of surfacing veil as the primary corrosion barrier in thermoset resin fiber reinforced laminates is well known in the glass fiber reinforced plastic industry.

In the American Society for Testing and Materials (hereinafter ASTM) C582-87 entitled *Standard Specification for Contact-Molded Reinforced Thermosetting Plastic (RTP) Laminates for Corrosion Resistant Equipment*, which is incorporated by reference, contact molding is defined in section 3.4 as ". . . a method of fabrication wherein the glass-fiber reinforcement is applied to the mold, in the form of chopped-strand mat or woven roving, by hand or from a reel, or in the form of chopped strands of continuous-filament glass from a chopper-spray gun. The resin matrix is applied by various methods, including brush, roller, or spray gun. Consolidation of the composite laminate is by rolling."

A surfacing veil or mat is defined in ASTM C582-87, ASTM D4097-88, and ASTM D3299-88. A surfacing veil or mat is defined in ASTM C582-87, section 5.2.1 of ASTM C582-87 as "a thin mat of fine fibers used primarily to produce a smooth surface on a reinforced plastic." 5.2.1.2 of ASTM C582-87 states that the requirements of acceptable surface veils are:

"(a) Resin compatibility.
(b) Uniform fiber distribution.
(c) Single filaments (not bunched)
(d) The veil layer(s) shall be a minimum of 10 mils in dry thickness producing a 10 to 15 mil resin saturated veil layer per 10 mils of dry veil, and
(e) Minimum fiber length shall be 0.5 in.

Note 9—The chemical resistance of the RTP laminate is provided by the resin. In combination with the cured resin, the surfacing veil helps determine the thickness of the resin-rich layer, reduces microcracking, and provides a nonwicking chemically resistant layer.

Additional desirable considerations in choosing a veil for a specific application include:

(a) Drapability (surfacing veil should conform to mold shape).
(b) Dry and wet tensile strength.
(c) Binder solubility (if used)
(d) Uniform wetting.
(e) Surfacing vet shall wet-out completely without trapping air during laminating, and
(f) Surfacing veil should not inhibit resin cure."

The surfacing veil is a reinforcement material that when saturated with resin (sometimes referred to as "wet out") retains a high resin to reinforcement ratio. Thermoset resin is very chemically resistant and the surfacing veils of the prior art are in many cases susceptible to attack by the chemical being contained. If the surfacing veils of the prior art are exposed to the chemical contained due to a breach in the resin, attack of the reinforcement material may start, leading to a shortened service life and equipment failure.

Surfacing veils of the prior art are commonly made from monofilament glass or polyester fibers. The most commonly used monofilament glass fibers are known in the art as "C" glass. The most commonly used polyester fibers used for surfacing veil are sold by E. I. Dupont de Nemours & Co. under the trademark Dacron.

Exemplary of the related art are the following U.S. Patents:

U.S. Pat. No. 5,077,115 discloses thermoplastic composite material including a thermoplastic matrix which is highly filled with a coated ceramic filler. In an important feature of the present invention, the ceramic filler has been coated with a rubbery polymer that bonds to the filler. In a preferred embodiment, the thermoplastic matrix comprises a fluoropolymer, preferably a chlorofluoropolymer and the ceramic filler is a fused amorphous silica coated with a rubbery polymeric material. The thermoplastic composite material of this invention exhibits numerous advantages which makes it well suited for use as a bonding film, particularly a bonding film for producing multilayer printed wiring bonds.

U.S. Pat. No. 4,943,473 discloses flexible laminated fluoropolymer-containing composites including fire and chemical resistant, flexible composites made from flexible woven, non-woven and knitted substrates and fluoropolymer containing films. Adhesives, such as melt adhesives, may be used in making the composites. The composites are suitable for use in protective garments, and in other articles where flexible chemically resistant materials are needed. A seaming technique for use in protective articles is disclosed.

U.S. Pat. No. 4,886,699 discloses a glass fiber reinforced fluoropolymeric circuit laminate including one or more layers of fluoropolymer impregnated woven glass cloth sandwiched between one or more layers of "random" microfiberglass reinforced fluoropolymer. This composite of fluoropolymer, woven glass fabric and random glass microfibers may be clad on one or both outer surfaces with a suitable conductive martial such as copper or certain known resistive foils. The fluoropolymer impregnated woven glass layer or layers will be nested between microfiberglass reinforced fluoropolymer layers to provide the outer surfaces of the circuit with smooth surfaces for fine line circuitry. The circuit laminate of the invention exhibits good dimensional stability, smooth surfaces for fine line circuitry, good electrical properties, and strong foil and interlaminar adhesion properties.

U.S. Pat. No. 4,886,689 discloses a matrix-matrix polyblend adhesives and method of bonding incompatible polymers useful in an adhesive tie layer to bond incompatible polymer layers. The adhesives are a blend of the components making up the incompatible polymer layers themselves, or polymers substantially similar to these, and are melt processed to produce a matrix-matrix morphology with mechanical interlocking of the polymer components that is maintained upon cooling. Additives may be provided in one or both adhesive components to improve the cohesive strength of the adhesive formed by the mechanical interlocking.

U.S. Pat. No. 4,777,351 discloses devices including conductive polymer compositions. A number of improvements to electrical devices, particularly sheet heaters, including conductive polymer compositions, are provided. The preferred heater has the following features (a) it includes a laminar resistive element and a plurality of electrodes which are so positioned that the predominant direction of current flow is parallel to the faces of the laminar element, (b) it includes a laminar insulating element adjacent to but not secured to the electrodes and the resistive element; (c) it includes a metallic foil, which acts as a ground plane and is positioned adjacent the insulating element but is not secured thereto; (d) it includes a dielectric layer intimately bonded to the resistive element and to the electrodes.

The invention also provides an electrical device including first and second members having different resistivities, and a thin contact layer of intermediate resistivity positioned between the first and second members.

U.S. Pat. No. 4,770,927 discloses a reinforced fluoropolymer composite which includes a substrate having a coating matrix including an initial layer of a perfluoropolymer and an overcoat including a fluoroelastomer, a fluoroplastic, a fluoroelastomer/fluoroplastic blend, or a combination thereof. The perfluoropolymer in the initial layer may be a perfluoroplastic, a perfluoroelastomer, or blends thereof. In a separate embodiment, the novel composite includes a substrate coated solely with one or more layers of perfluoroelastomer alone or as a blend with a perfluoroplastic. Where the substrate is not susceptible to hydrogen fluoride corrosion, the composite may include solely one or more layers of a blend of a fluoroelastomer and a hydrogen-containing perfluoroplastic. Cross-linking accelerators may be used to cross-link one or more of the resins contained in the coating layers. Each composite may be top-coated with a layer or layers of a fluoroplastic, fluoroelastomer, and/or a blend thereof. The composite is flexible, exhibits good matrix cohesion and possesses substantial adhesion to the material acting as the reinforcement or substrate. A method for making such a composite includes the unique deployment of a perfluoropolymer directly onto the substrate in a relatively small amount sufficient to protect the substrate from chemical corrosion without impairing flexibility, followed by the application of the overcoat layer.

U.S. Pat. No. 4,677,017 discloses coextrusion of thermoplastic fluoropolymers with thermoplastic polymers. The coextruded film includes at least one thermoplastic fluoropolymer layer and at least one thermoplastic polymeric layer adjacent to the to the thermoplastic fluoropolymer layer. There is preferably a coextruded adhesive layer between each thermoplastic fluoropolymer layer and each thermoplastic polymeric layer. The coextruded film can be oriented in at least one direction and/or embossed without delamination, fibrillating, or splitting.

U.S. Pat. No. 4,539,113 discloses a fluororesin filter made entirely of fluororesin having both a high corrosion and high heat resistance. A plurality of tubular filtering elements are arranged in a fluororesin container. Each tubular filtering element has a polytetraethylene tubular filtering film closed at one end and arranged over or inserted into a fluororesin tubular support. The tubular filtering elements are connected to a cover structure, on the inner surface of which is formed a groove for communicating the tubular filtering elements to one of the liquid inlet and liquid outlet provided in the cover structure.

U.S. Pat. No. 4,505,971 discloses a fluoroplastic and metal laminate having rubber compound bonded layers, and a process and composition for adhering a rubber compound to a fluoroplastic and/or to metal. The invention contemplates the use of separate sequentially applied adhesive layers to the fluoroplastic or metal substrate. The last applied layer, a rubber cement, allows the metal or fluoroplastic to be adhered to the uncured rubber compound which is subsequently vulcanized. The invention finds particular utility in securing a fluoroplastic and a rubber lining to steel or other metallic surfaces. A typical use is the lining of the interior of a railroad tank car, providing protection from corrosive or hostile environments experienced when the tank car is transporting acids or other caustic materials. Other uses include the lining of chemical process vessels and piping.

U.S. Pat. No. 4,163,505 discloses foldable liners for fluids holding storage tanks which are polyhedrical shaped liners, mounted vertically inside a cylindrical storage tank, and fixed to the inner top of the tank.

The lower portion of the liner is fitted to a rigid frame which is free to displace in the vertical direction.

Devices located on equidistant horizontal narrow strips of the liner, restrain the strips from displacing radially inward but allow them to move in the vertical direction.

Devices that apply forces directed vertically upwards over the rigid frame and of sufficient magnitude to produce critical compressive stresses in the liner are provided.

These critical compressive stresses induce buckling of the portions of the liner between successive narrow strips, and folding of the liner-in-situ is achieved.

U.S. Pat. No. 3,833,453 discloses a nonflammable, fiber-filled, cold-formable thermoplastic sheets which are glass fiber-reinforced ethylene chlorotrifluoroethylene composite sheets formable into shaped objects in a mold at ambient temperatures solely by moderate preheating of the sheet outside of the mold. This polymer including a high molecular weight, tough copolymer of ethylene and chlorotrifluoroethylene in an approximate 1:1 mol ratio is inherently non-flammable in air. A glass fiber of controlled length increases the mechanical properties of the composite structure and allows fabrication into suitable shapes without detracting from the nonflammable properties of the polymeric composite.

SUMMARY OF THE INVENTION

It is an object of the invention to provide a surfacing veil for utilization in laminates made from reinforced thermosetting resins.

It is another object of the invention to provide a surfacing veil for utilization in laminates made from reinforced thermosetting resins which has enhanced chemical resistance, good abrasion resistance, and excellent interlaminar sheer strength between the surfacing veil and an adjacent lamina.

It is yet another object of the invention to provide a surfacing veil for utilization in laminates made from reinforced thermosetting resins which provides a corrosion barrier reinforcement which due to its chemical resistance would provide a longer service life for the laminates without substantial increases in cost of the laminates.

It is a further object of the invention to provide a corrosion resistant surfacing veil for utilization in laminates made from reinforced thermosetting resins which may be utilized with the application techniques commonly in use.

It is a yet further object to provide a surfacing veil which can be used with a wide variety of thermoset resins.

It is also an object of the invention to provide a chemically resistant surfacing veil that is also flame resistant.

In accordance with the present invention there is provided a corrosion resistant surfacing veil of a thermoplastic fluoropolymer, and corrosion resistant reinforced thermoset plastic laminates having a surfacing veil of a thermoplastic fluoropolymer.

BRIEF DESCRIPTION OF THE DRAWING

The single drawing FIGURE is an enlarged schematic side view of a multilayer laminate of the invention.

DESCRIPTION OF THE PREFERRED EMBODIMENTS

The present invention is a surfacing veil made from a fluoropolymer, and contact molded reinforced plastic laminates utilizing the surfacing veil of the invention. Contact molding as use herein includes contact-molding as disclosed in ASTM C582-87, ASTM D4097-88, and molding or fabricating by filament-winding as disclosed in ASTM D3299-88. ASTM D3299-88 and ASTM D4097-88 are hereby incorporated by reference.

Surfacing veils of the invention are made from thermoplastic fluoropolymers such as chlorotrifluoropolymers, and the copolymers of tetrafluoroethylene and, perfluoroalkoxy resins, fluorinated ethylenepropylene, polyvinyl fluoride, and polyvinylidene fluoride.

The most preferred surfacing veil of the invention is veil made from copolymers of ethylene and chlorotrifluoroethylene (sometimes referred to as ECTFE) such as HALAR®, which is a copolymer of ethylene and chlorotrifluoroethylene sold by Ausimont USA, Inc. of Morristown, N.J. and described in HALAR® FLUOROPOLYMER RESIN ADVANTAGE, EXPANDED LIST—CHEMICAL RESISTANCE OF HALAR® FLUOROPOLYMER, hereby incorporated by reference, and in described in U.S. Pat. No. 3,833,453, hereby incorporated by reference. The most preferred surfacing veil of the invention is a melt blown thermoplastic fluoropolymer fiber filter media sold by Ausimont USA, Inc. of Morristown, N.J. and made from HALAR®.

Reinforcement materials include, in addition to the surfacing veil, chopped-strand mat, woven roving, and roving made from glass fibers. Other reinforcing fibers may be used if desired, but glass fibers are preferred.

The preferred laminates of the invention utilize a thermosetting resin. Suitable thermosetting resins include polyester or vinyl ester thermosetting resins, and other thermosetting resins made from phenols, furans, epoxies, and the like. ASTM C582-87 section 1.1 states that "thermoset polyester, vinyl ester, or other qualified thermosetting resin laminates" may be utilized. Polyester and vinyl ester thermosetting resins which may be used in the present invention are defined in ASTM C582-87, section 3.2 and 3.3 as follows:

"3.2 polyester—resins produced by the polycondensation of dihydroxyderivatives and dibasic organic acids or anhydrides, wherein at least one component contributes ethylenic unsaturation yielding resins that can be compounded with styryl monomers and reacted to give highly crosslinked thermoset copolymers.

3.3 vinyl esters—resins characterized by reactive unsaturation located predominately in terminal positions that can be compounded with styryl monomers and reacted to give highly crosslinked thermoset copolymers.

Note 2—These resins are handled in the same way as polyesters in fabrication of RTP components."

Catalysts well known in the art are preferably used with the thermosetting resins used to form the laminates of the invention to initiate the chemical reaction which causes the thermosetting resin to cure. Typical catalysts include peroxides such as methyl ethyl ketone peroxide, cumene hydroperoxide, and the like. Promoters well known in the art are preferably used to shorten the curing time of the thermosetting resins. Typical promoters include cobalt napthenate, benzoyl peroxide and the like.

EXAMPLE

A flat sheet of corrosion resistant laminate was contact molded in accordance with ASTM C582-87 as follows:

A melt blown thermoplastic fluoropolymer fiber filter media sold by Ausimont USA, Inc. of Morristown, N.J. and made from HALAR® was used as a surfacing veil in preparing the corrosion resistant laminate of the example. The surfacing veil utilized in preparing the laminate of the example had a weight of 3 oz/yd$^2$ and exhibited good mechanical properties needed for application to a stationary or rotating mold. Surfacing veil having a weight of 1½ oz/yd$^2$ did not exhibit the mechanical properties required for application to a rotating mold and was not utilized.

The surfacing veil fibers had a mean fiber diameter of 7.9 to 8.5 µm, where "µm" is a micro-meter. Excellent saturation or wet-out of the surfacing veil was achieved as well as a high resin to reinforcement ratio. The surfacing veil allowed the entrapped air to be rolled out easily and passed the liner void inspection as easily as conventional surfacing veils.

The surfacing veil had two distinctive sides. One side was "smooth", and the other side was "fuzzy". In preparing the laminate of the example, the fuzzy side was placed toward the mold.

The thermosetting resin utilized in preparing the corrosion resistant laminate 10 of the example was a vinyl ester resin sold by the Dow Chemical Company under the trademark Derakane 470-36 and described in *Fabricating Tips-Derakane vinyl ester resins*, hereby incorporated by reference, *Derakane Resins-Chemical Resistance and Engineering Guide*, hereby incorporated by reference. Preferably promoters and catalysts are used with the vinyl ester resin. The vinyl ester resin Derakane 470-36 used in preparing the laminate 10 utilized cobalt napthenate as a promoter and methyl ethyl ketone peroxide as a catalyst as recommended by Dow Chemical Company. The promoter was mixed with the resin, and then the catalyst was added to initiate the exothermic reaction.

Chopped-strand mat used for reinforcing the laminate 10 was "E" type glass fiber, 1½ oz/ft$^2$, with sizing and binder compatible with the resin, as required in ASTM C582-87, section 5.2.2.

Woven roving used for reinforcing the laminate 10 was "E" type glass, 24½ oz/yd$^2$, 5 by 4 square weave fabric and binder compatible with the fabric, as required in ASTM C582-87 section 5.2.3.

Laminate 10 was prepared in accordance with ASTM C582-87, and in particular section 6 thereof, as outlined in the following steps:

Step 1: A coating of the catalyzed vinyl ester resin was applied to the mold surface. The mold is the side facing the process or corrosive chemicals in contact with the laminate 10.

Step 2: One layer of the surfacing veil 12 was applied with the fuzzy side toward the mold surface and was rolled into the catalyzed resin on the mold surface using a serrated hand roller to eliminate air entrapment and to compress the layer into a uniform thickness.

Step 3: A second coat of the catalyzed vinyl ester resin was applied.

Step 4: A first layer 14 of the 1½ oz/ft$^2$ "E" type glass fiber chopped strand mat was applied and was rolled into the resin using a serrated hand roller to eliminate air entrapment and to compress the layer into a uniform thickness.

Step 5: A third coat of the vinyl ester resin was applied.

Step 6: A second layer 16 of the 1½ oz/ft$^2$ "E" type glass fiber chopped strand mat was applied and was rolled into the resin using a serrated hand roller to eliminate air entrapment and to compress the layer into a uniform thickness.

Step 7: A fourth coat of the catalyzed vinyl ester resin was applied and the laminate was allowed to exotherm.

Step 8: A fifth coat of the catalyzed vinyl ester resin was applied.

Step 9: A third layer 18 of the 1½ oz/ft² "E" type glass fiber chopped strand mat was applied and was rolled into the resin using a serrated hand roller to eliminate air entrapment and to compress the layer into a uniform thickness.

Step 10: A sixth coat of the vinyl ester resin was applied.

Step 11: A first layer 20 of the 24½ oz/yd² woven roving was applied and was rolled into the resin using a serrated hand roller to eliminate air entrapment and to compress the layer into a uniform thickness.

Step 12: A seventh coat of the vinyl ester resin was applied.

Step 13: A fourth layer 22 of the 1½ oz/ft² "E" type glass fiber chopped strand mat was applied and was rolled into the resin using a serrated hand roller to eliminate air entrapment and to compress the layer into a uniform thickness.

Step 14: An eighth coat of the vinyl ester resin was applied.

Step 15: A second layer 24 of the 24½ oz/yd² woven roving was applied and was rolled into the resin using a serrated hand roller to eliminate air entrapment and to compress the layer into a uniform thickness.

Step 16: A ninth coat of the vinyl ester resin was applied.

Step 17: A fifth layer 26 of the 1½ oz/ft² "E" type glass fiber chopped strand mat was applied and was rolled into the resin using a serrated hand roller to eliminate air entrapment and to compress the layer into a uniform thickness.

Step 18: A tenth coat of the vinyl ester resin was applied.

Step 19: A sixth layer 28 of the 1½ oz/ft² "E" type glass fiber chopped strand mat was applied and was rolled into the resin using a serrated hand roller to eliminate air entrapment and to compress the layer into a uniform thickness.

Step 20: An eleventh coat of the vinyl ester resin was applied and the laminate was allowed to exotherm.

The laminate 10 was allowed to fully cure and was then prepared for testing. A plurality of specimens labeled A through F were cut from laminate 10 for testing. The cured thickness of the resin coated surfacing veil 12 was approximately 0.030 inches. The specimens A-F were tested in accordance with the ASTM testing procedure shown in each table, and the results recorded in the following tables 1–5.

The tensile properties as shown in Table 1 are similar to tensile properties achieved utilizing the surfacing veils of the prior art.

The flexural properties shown in Table 2 are greater than the flexural properties achieved using the surfacing veils of the prior art and indicate that the surfacing veil and laminates 10 of the invention have enhanced flexibility.

The in-plane shear strength shown in Table 3 was conducted between the layer 12 containing the surfacing veil of the invention and layer 14 containing the chopped strand mat. The average in plane shear strength between layer 12 and 14 was about 3,300 psi and was acceptable.

Abrasion resistance is shown in Table 4 and was acceptable, as were the compressive properties shown in Table 5.

Chemical resistance for the HALAR® fluoropolymer from which the surfacing veil is made is shown in Table 6.

TABLE 1

Standard Test Method for
TENSILE PROPERTIES OF PLASTICS
ASTM D 638

TEST SPECIMENS machined (X) cast ( )   SPEED of TESTING 0.20 in./min.
TYPE SPECIMEN III   TEST TEMP./HUM. (69 deg. F./65%)   GAUGE LENGTH 2.00 in

| specimen | width (in.) | depth (in.) | area (sq. in) | max. load (pounds) | tens. strength (psi) | elong. @ break | modulus (psi) |
|---|---|---|---|---|---|---|---|
| A | 1.007 | 0.230 | 0.232 | 3220 | 13,900 | 1.1% | 1.90 E + 06 |
| B | 1.005 | 0.232 | 0.233 | 3470 | 14,900 | 1.2% | 1.72 E + 06 |
| C | 1.006 | 0.234 | 0.235 | 3370 | 14,300 | 1.2% | 1.74 E + 06 |
| D | 1.012 | 0.235 | 0.238 | 3320 | 13,900 | 1.1% | 1.54 E + 06 |
| E | 1.013 | 0.232 | 0.235 | 3300 | 14,000 | 1.1% | 1.52 E + 06 |
|  |  |  |  | AVG. | 14,200 | AVG. | 1.68 E + 06 |
|  |  |  |  | STD.DEV. | 424 | STD.DEV | 1.57 E + 05 |

TABLE 2

FLEXURAL PROPERTIES OF UNREINFORCED AND REINFORCED PLASTIC
AND ELECTRICAL INSULATING MATERIALS
ASTM D790

TEST METHOD/PROCEDURE =I/A   SPAN/DEPTH RATION L/D = @16/1   SPAN = 4.00 INCHES
LOADING NOSE/SUPPORT RADIUS = .12/.12   RATE OF CROSSHEAD MOTION = 0.11 in./min.

| specimen | width b | depth d | max. load P | flexural strength (psi) | slope m | flexural modulus (psi) |
|---|---|---|---|---|---|---|
| A | 0.586 | 0.230 | 137.2 | 26,600 | 4370 | 9.81 E + 06 |
| B | 0.557 | 0.227 | 125.0 | 26,100 | 4330 | 1.06 E + 07 |
| C | 0.558 | 0.226 | 122.7 | 25,800 | 4000 | 9.94 E + 06 |
| D | 0.577 | 0.230 | 140.2 | 27,600 | 4290 | 9.78 E + 06 |
| E | 0.564 | 0.238 | 130.8 | 24,600 | 4620 | 9.72 E + 06 |
| F | 0.573 | 0.224 | 134.7 | 28,100 | 4120 | 1.02 E + 07 |
|  |  |  | AVG. = | 26,500 | AVG. = | 1.00 E + 07 |
|  |  |  | STD. DEV. = | 1,270 | STD.DEV. = | 3.36 E + 05 |

TABLE 3

Standard Test Method for
IN-PLANE STRENGTH of REINFORCED PLASTICS
ASTM D 3846

TEST SPECIMENS machined (X) cast ( )   TEST TEMP./HUM. (68 DEG. F/65%)

| specimen | width (in.) | depth (in.) | area (sq. in) | max. load (pounds) | SHEAR STRENGTH (psi) |
|---|---|---|---|---|---|
| A | 0.494 | 0.248 | 0.122 | 399 | 3270 |
| B | 0.480 | 0.248 | 0.119 | 398 | 3340 |
| C | 0.487 | 0.248 | 0.121 | 371 | 3070 |
| D | 0.481 | 0.250 | 0.120 | 411 | 3420 |
| E | 0.482 | 0.250 | 0.120 | 411 | 3420 |
|  |  |  |  | AVG. | 3300 |
|  |  |  |  | STD. DEV. | 145 |

NOTE: In-plane shear test conducted at corrosion resistant/woven laminate bond interface.

TABLE 4

RESISTANCE OF PLASTIC MATERIALS TO ABRASION
ASTM D1242

TEST METHOD/PROCEDURE = A/FIXED ABRASIVE        ABRASIVE: GRIT/ BRAND = 80/3 M

| specimen | width in. | length in. | area sq. in. | load pds. | load p.s.i. | test duration | volume loss cu./cm. |
|---|---|---|---|---|---|---|---|
| A | 1.935 | 2.915 | 5.64 | 10 | 1.77 | 1000 REV. | 6.46 |
| B | 1.940 | 2.975 | 5.77 | 10 | 1.73 | 1000 REV. | 6.30 |
| C | 1.990 | 2.940 | 5.85 | 10 | 1.71 | 1000 REV. | 6.21 |
| D | 1.980 | 2.970 | 5.88 | 10 | 1.70 | 1000 REV. | 6.27 |
| E | 1.920 | 2.940 | 5.65 | 10 | 1.77 | 1000 REV. | 6.43 |
|  |  |  |  |  |  | AVG. | 6.33 |
|  |  |  |  |  |  | Std. Dev. | 0.11 |

NOTE: Abrasion test conducted on corrosion resistant side of laminate.

TABLE 5

COMPRESSIVE PROPERTIES OF ORIENTED FIBER COMPOSITES
ASTM D 3410

TEST SPECIMENS machined (X) cast ( )   TAB MATERIAL/ADHESIVE INTEGRAL
TEST TEMPERATURE/HUMIDITY (68 deg./65%)   SPEED OF TESTING 0.15 in./min.

| specimen | width (in.) | depth (in.) | area sq. in. | max. load (pounds) | compressive strength (psi) | elastic modulus (psi) |
|---|---|---|---|---|---|---|
| A | 0.495 | 0.122 | 0.060 | 1999.8 | 33,330 | 3.24 E + 06 |
| B | 0.483 | 0.121 | 0.058 | 1994.2 | 34,380 | 3.49 E + 06 |
| C | 0.484 | 0.115 | 0.056 | 1794.1 | 32,040 | 3.66 E + 06 |
| D | 0.490 | 0.114 | 0.056 | 1939.1 | 34,630 | 3.58 E + 06 |
| E | 0.485 | 0.108 | 0.052 | 1659.5 | 31,910 | 3.63 E + 06 |
| F | 0.488 | 0.101 | 0.049 | 1677.5 | 34,230 | 3.92 E + 06 |
|  |  |  |  | AVG. | 33,420 | 3.59 E + 06 |
|  |  |  |  | STD.DEV. | 1,202 | 2.23 E + 05 |

TABLE 6

MAXIMUM OPERATING TEMPERATURES FOR CHEMICAL RESISTANCE

| | | MAXIMUM ALLOWABLE TEMPERATURE F°. | |
|---|---|---|---|
| CHEMICAL | PERCENT | PREMIUM GRADE VINYL ESTER THERMOSET RESIN | HALAR ® |
| ALCOHOL METHYL | 100 | 100 | 300 |
| ALCOHOL BUTYL | 100 | 120 | 300 |
| AMMONIUM HYDROXIDE | 10–20 | 150 | 300 |
| ANILINE | 100 | 70 | 73 |
| ARSENIC ACID | ALL | 100 | 300 |
| BENZENE | 100 | 100 | 150 |
| BORIC ACID | 100 | 210 | 300 |
| BUTYL ACETATE | 100 | 80 | 150 |
| CARBON TETRACHLORIDE | 100 | 180 | 300 |
| CHLORINE GAS - WET | 100 | 250 | 250 |
| CHLORINE WATER | SAT'D | 210 | 250 |
| CHROMIC ACID | 10 | 150 | 212 |
| CHROMIC ACID | 30 | N/R | 212 |
| CYCLOHEXANE | 100 | 150 | 212 |
| DETERGENTS | 100 | 180 | 300 |
| ETHYL CHLORIDE | 100 | 80 | 300 |
| ETHYLENE DICHLORIDE | 100 | 80 | 73 |
| ETHYLENE GLYCOL | ALL | 210 | 300 |
| FORMIC ACID | 98 | 100 | 250 |
| FREON 113 SOLVENT | | 100 | 121 |
| GASOLINE UNLEADED | | 150 | 300 |
| HYDROCHLORIC ACID | 37 | 180 | 300 |
| HYDROFLUORIC ACID | 10 | 150 | 300 |
| HYDROFLUORIC ACID | 20 | 100 | 250 |
| SODIUM HYDROXIDE | 15 | 150 | 300 |
| SODIUM HYDROXIDE | 25 | 180 | 250 |
| SODIUM HYPOCHLORITE | 5 | 180 | 250 |
| SULFURIC ACID | 25 | 210 | 250 |
| SULFURIC ACID | 75 | 120 | 250 |
| SULFURIC ACID | 93 | N/R | 150 |
| TOLUENE | 100 | 120 | 120 |
| XYLENE | 100 | 120 | 120 |

Although the preferred embodiments of the invention have been described in detail above, it should be understood that the invention is in no sense limited thereby, and its scope is to be determined by that of the following claims:

What is claimed is:

1. In a reinforced corrosion resistant laminate utilizing a thermosetting resin, the improvement comprising incorporating therein a surfacing veil of a thermoplastic fluoropolymer, wherein said thermosetting resin is a polyester resin.

2. The laminate of claim 1 wherein said thermoplastic fluoropolymer is a copolymer of ethylene and chlorotrifluoroethylene.

3. The laminate of claim 2 wherein said laminate is contact molded.

4. The laminate of claim 1 wherein said laminate is contact molded.

5. In a reinforced corrosion resistant laminate utilizing a thermosetting resin, the improvement comprising incorporating therein a surfacing veil of a thermoplastic fluoropolymer, wherein said thermosetting resin is phenol.

6. The laminate of claim 5 wherein said thermoplastic fluoropolymer is a copolymer of ethylene and chlorotrifluoroethylene.

7. The laminate of claim 6 wherein said laminate is contact molded.

8. The laminate of claim 5 wherein said laminate is contact molded.

9. In a reinforced corrosion resistant laminate utilizing a thermosetting resin, the improvement comprising incorporating therein a surfacing veil of a thermoplastic fluoropolymer, wherein said thermosetting resin is an epoxy resin.

10. The laminate of claim 9 wherein said thermoplastic fluoropolymer is a copolymer of ethylene and chlorotrifluoroethylene.

11. The laminate of claim 10 wherein said laminate is contact molded.

12. The laminate of claim 9 wherein said laminate is contact molded.

* * * * *